United States Patent [19]

Eyas

[11] Patent Number: 5,146,870
[45] Date of Patent: Sep. 15, 1992

[54] LIQUID NUTRIENT DISPENSERS FOR AQUARIUM BIOLOGICAL FILTER MEDIA

[75] Inventor: Andres V. Eyas, Carol Stream, Ill.

[73] Assignee: International Seaboard Corp., Chicago, Ill.

[21] Appl. No.: 471,929

[22] Filed: Jan. 29, 1990

[51] Int. Cl.⁵ .............................................. A01K 63/04
[52] U.S. Cl. ........................................... 119/5; 119/3; 215/308; 222/189; 210/169
[58] Field of Search ....................... 119/3, 5; 222/189; 4/228; 215/308; 210/169

[56] References Cited

U.S. PATENT DOCUMENTS

| 649,316 | 5/1900 | Lambert | 215/308 |
| 2,418,035 | 3/1947 | Lachapelle | 222/187 |
| 3,326,401 | 6/1967 | DeLong | 215/308 |
| 3,869,069 | 3/1975 | Levey et al. | 4/228 |

FOREIGN PATENT DOCUMENTS

| 503468 | 6/1954 | Canada | 222/187 |
| 2037719 | 7/1980 | United Kingdom | 215/308 |

*Primary Examiner*—John G. Weiss
*Attorney, Agent, or Firm*—Leydig, Voit & Mayer

[57] ABSTRACT

A dispenser is provided for liquid nutrients used to sustain the metabolism of biological filter media used in purifying aquarium water which comprises: a rigid container having an opening therein adapted to permit the introduction of liquid nutrients into the container; means for preventing the flow out of the container through said opening of liquid nutrient introduced therein; and means for allowing the permeation to the exterior of the container of liquid nutrient introduced therein.

10 Claims, 2 Drawing Sheets

LIQUID NUTRIENT DISPENSERS FOR AQUARIUM BIOLOGICAL FILTER MEDIA

TECHNICAL FIELD

This invention is related generally to biological purification processes of aquarium water, and more particularly to means for dispensing liquid nutrients needed by the bacteria of biological filter media used in aquarium filtration systems.

Background of the Invention

There has long been an interest in maintaining fresh water and marine fishes and invertebrates in essentially closed-system aquariums for both scientific and recreational purposes. In a closed-system the aquarium water must be purified to prevent the accumulation of harmful concentrations of waste products. In particular, waste products derived from dead organisms, uneaten food, and animal excretion be removed from the aquarium water. must One such waste product are nitrates ($NO_3^-$). The "nitrogen cycle", of which the assimilation and dissimilation of nitrates is a part, is well known, for example, as shown in S. Spotte, FISH AND INVERTEBRATE CULTURE: WATER MANAGEMENT IN CLOSED SYSTEMS 2 (J. Wiley & Sons, New York, 2d Ed. 1979).

Although nitrates can be removed from aquarium water, in whole or in part, by regular partial water changes, by culturing plants, or with ion exchange media, a particularly successful method of removing nitrates, i.e., denitrification, involves the use of biological filter media. In essence, such filter media comprise nitrate dissimilating bacteria, such as *Pseudomonas stutzeri*, *Micrococcus denitrificans*, and certain Vibrio species. These bacteria typically are cultured from a naturally occurring mixture of bacteria obtained from ocean mud.

The nitrate dissimilating bacteria in such filter media require a source of dissolved organic carbon. Such nutrients include lactose, dextrose, methanol, and phthalic acid compounds and derivatives. The nutrients are needed to sustain the metabolic processes of the bacteria. Accordingly, biological denitrifying filters typically comprise various means for providing the biological media with such nutrients.

One type of biological denitrification filter is disclosed in U.S. Pat. No. 4,620,929 to H. Hofmann. Those filters utilize particles of an inert carrier, such as plastic material or expanded clay, upon which are carried nutrients. The particles provide both a substrate for the establishment of denitrifying bacteria and, by virtue of the nutrients carried thereon, sustenance for the bacteria's metabolic processes. Filters utilizing such particle beds are commercially available, e.g., Nitrex ® filters sold by Aquarium Products, Glen Burnie, Md.

A serious disadvantage of such filters derives from the fact that they utilize the inert carrier both as a substrate for the bacteria and, in effect, a dispenser for nutrients. Accordingly, when the nutrients are exhausted the nutrient supply can be replenished only by replacing the particle bed. In doing so, the bacteria culture in the depleted particle bed is discarded, and a new culture must be established in the fresh particle bed.

Another well known type of denitrifying biological filter is shown in FIGS. 1-2. Such filters 1 comprise a multichamber container 2 into which are disposed one or more biological filter media 10, for example a plastic mesh spool onto which a culture of nitrate dissimilating bacteria is grown. They also comprise one or more dispensers for nutrients 20.

Typically, a small portion of oxygen-depleted effluent water A from an aerobic biological filter is diverted first through the chamber 3 containing the nutrient dispenser 20, whereby the effluent is enriched with nutrients. The nutrient-enriched water B then is passed into another chamber 4 and through the biological media 10 where dissimilation of nitrates occur. The denitrified effluent C is returned to the aerobic filter and eventually to the aquarium.

Such denitrifying biological filters may constitute a part of an integrated, multistage filter unit, or they may be separate components connected with other types of filter units or the aquarium. Examples of those types of denitrifying filters are well known to workers in the art and are commercially available. They include the Minireef ® Model H-30 and Model H-39 multistage filters and the Minireef ® Model H-85 Denitra ™ denitrification filter manufactured and sold by International Seaboard Corporation, Franklin Park, Ill.

The nutrient dispensers 20 used in denitrification filters of this type heretofore typically have consisted of a bag 21 designed for use with liquid nutrients. The bag 21 is composed of a microporous plastic film through which the nutrient can permeate slowly. A tube of such plastic material is provided with heat seals 22 to form the bag 21 and a small opening 23 therein. The opening 23 is configured so as to receive a conical plug 24 composed, e.g., from a compressible rubber material.

Such nutrient dispensers 20 have provided satisfactory results in terms of dispensing liquid nutrients. They also can be refilled and the nutrient supply maintained without disturbing in any manner an established bacteria culture. There are, however, a number of problems inherent in their use.

Such denitrification filter units and their component chambers typically are solid-rectangularly shaped because they can be made more easily and cheaply in that manner. It also is generally desirable to minimize the overall size of filter units, especially those designed for use by the hobbyist. Accordingly, the nutrient chamber 3 usually is designed to rather closely accommodate the dispenser bag 20. When the dispenser bag 20 is filled with liquid nutrient, however, it tends to bulge into a more or less cylindrical shape, thereby making it awkward to insert into the rectangular shaped opening of the nutrient chamber 3.

Because the capacity of the bag can change depending on how it is held, or through carelessness, users of the bag also often overfill or underfill the dispenser bag 20. If the bags 20 are underfilled, it will be necessary to refill the bags 20 at more frequent intervals. The nutrient also can be depleted sooner than anticipated, and the bacteria culture starved. If the bags 20 are overfilled, however, invariably the plug 24 will be forced out of the bag and liquid nutrients will be spilled during the course of inserting the bag 20 into the chamber 3. This loss of nutrients is not only aggravating and costly to the consumer, but excess amounts of some nutrients such as methanol can actually harm aquarium stock.

It also will be appreciated that such bags 20 are easily punctured and the heat seals 22 in the bag 20 can deteriorate over time, thereby limiting the useful life of the bag 20 and necessitating its replacement. Further, because the bag 20 usually is wet during the refilling process, small punctures and deterioration of the seams 22 may escape notice for some time allowing excess, and perhaps harmful amounts of nutrient to flow out of the dispenser.

Finally, the bag 20 itself is light weight, flimsy, and very flexible making it difficult to fill and insert the plug.

An object of the subject invention, therefore, is to provide means for dispensing liquid nutrients needed by the bacteria of biological filter media which allow the nutrient supply to be replenished without disturbing the bacteria culture or necessitating the reestablishment thereof.

Another object of the subject invention is to provide such dispensing means which may be more easily filled and more easily inserted into the nutrient chamber of conventional biological filters without spillage.

A further object of the subject invention is to provide such dispensing means which may be more accurately filled with a predetermined quantity of liquid nutrient.

Yet another object of the subject invention is to provide a more durable and more leak resistant dispenser for such nutrients which has a longer useful life.

It also is an object of the subject invention to provide a nutrient dispenser wherein all of the above mentioned advantages are realized.

These and other objects and advantages of the invention will be apparent to those skilled in the art upon reading the following detailed description and upon reference to the drawings.

SUMMARY OF THE INVENTION

The invention provides for a dispenser for liquid nutrients used to sustain the metabolism of biological filter media used in purifying aquarium water, which dispenser comprises: a rigid container having an opening therein adapted to permit the introduction of liquid nutrients into the container; means for preventing the flow out of the container through said opening of liquid nutrient introduced therein; and means for allowing the permeation to the exterior of the container of liquid nutrient introduced therein.

DETAILED DESCRIPTION OF THE INVENTION

Figure 3:
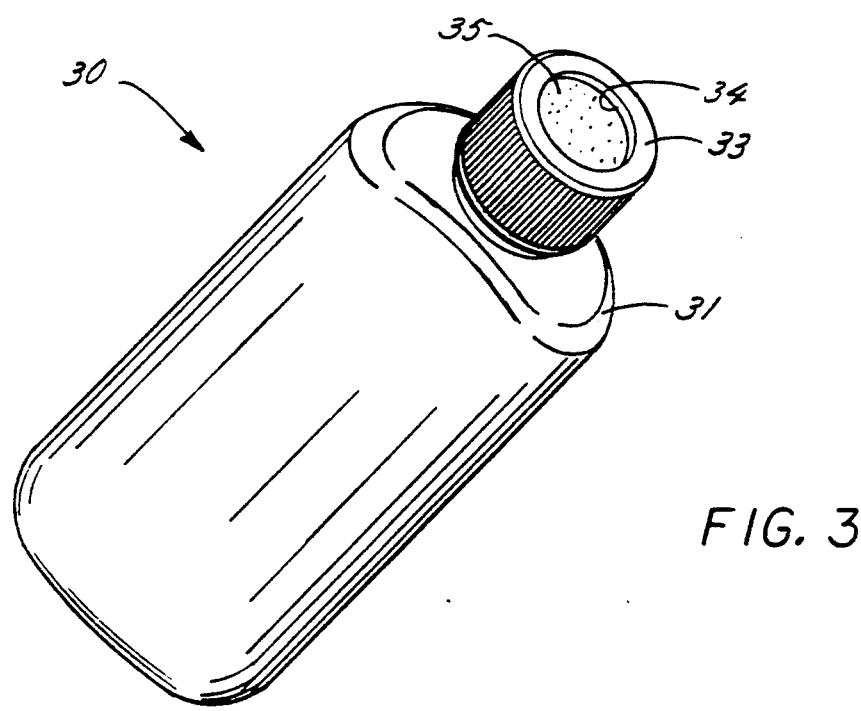
FIG. 3 is a perspective view of a preferred embodiment of the liquid nutrient dispensers of the subject invention, which view shows the construction thereof.
Figure 4:
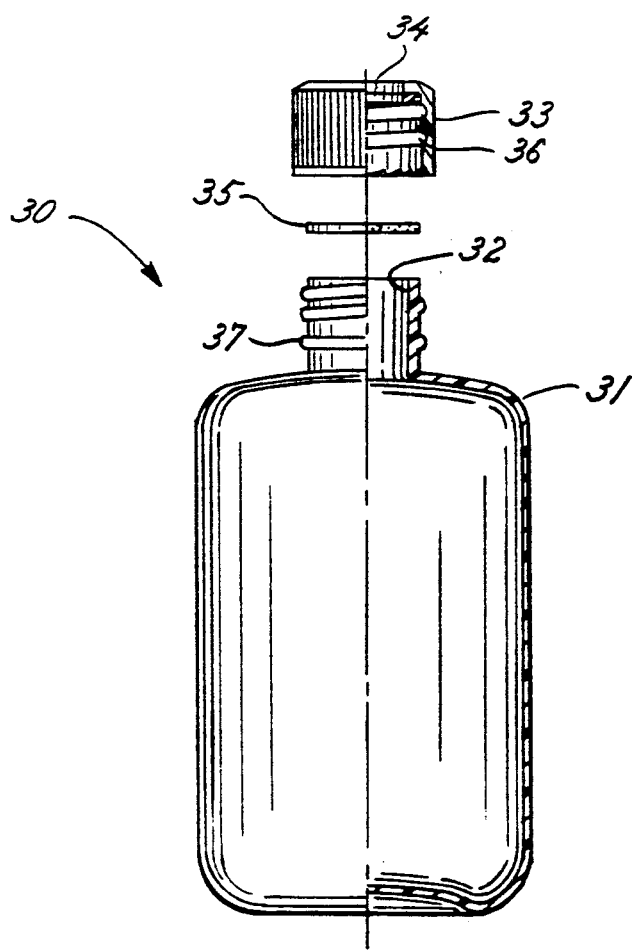
FIG. 4 is an exploded partial perspective and partial cross-sectional view of the liquid nutrient dispenser shown in FIG. 3, which view shows the relationship between the components of the dispenser.

As shown in FIGS. 3 and 4, a preferred embodiment 30 of the dispensers of the subject invention comprises a container 31 having an opening 32 which is adapted to permit the introduction of liquid nutrients into the container 31. The container 31 is provided with a removable cap 33. The cap 33 comprises an opening 34. Disposed within the cap 33 and over the opening 34 is a permeable body 35.

The container 31 is illustrated as being generally flask-shaped. It will be appreciated, however, that the shape of the container is not important per se, but rather the shape and size of the container are coordinated with the capacity and configuration of the biological filter with which the dispenser is to be used. The flask-shape of the preferred embodiment advantageously may be used with a filter unit, such as the prior art filter unit 1 shown in FIG. 1, which has a relatively narrow, solid-rectangularly shaped nutrient chamber. Cylindrical or solid-rectangular shaped containers may be used, however, in accordance with the size and shape of the chamber into which the dispenser will be inserted.

The capacity of the dispenser preferably is somewhat in excess of the amount of nutrient required to sustain the biological filter media in the intervals between regular periodic refills, e.g., monthly, bi-monthly, or semi-annual refills. The determination of such amounts is well within the skill of workers in the art and is dependent on well known factors as the stock maintained in the aquarium, the type of nutrient, and the capacity of the biological filter media.

In accordance with an important and preferred aspect of the invention, the container has a rigid structure. More precisely, the container is sufficiently rigid so that the shape thereof is substantially unchanged upon the introduction of liquid nutrient into the container.

Because the material of the container will be in contact with the aquarium water, the container should be substantially inert. That is, it should not react with the liquid nutrient, the aquarium water, or chemicals dissolved therein, nor should it release harmful elements into the aquarium water.

In accordance therewith, suitable containers may be obtained from commercial suppliers or may be constructed from a variety of well known materials by well known techniques. Such materials include rigid, so called barrier plastics, such as those included in the group comprising polyethylene, polypropylene, polyvinyl chloride, polyvinylidene fluoride, polyethylene terephthalate, and copolymers of acrylonitrile, e.g., acrylonitrile/styrene copolymers. Suitable materials also include metals, such as aluminum and stainless steel, glass, and treated paper products. While perfect inelasticity cannot be expected, such materials can provide a container of sufficient rigidity to prevent significant distortion of the container shape.

The cap 33 is provided with threads 36 adapted to removably engage threads 37 provided on the container 31, thereby permitting the container 31 to be refilled as needed. Other means for removably engaging the cap 33 with the container 31 may be provided, e.g., means suitable for a bayonet engagement, friction fit, or snap lock, and the precise engagement means is a matter of convenience so long as a reliable engagement is provided thereby. Moreover, while it is preferred that the cap be removable, that is not strictly required if a disposable, single-use, nonrefillable dispenser is desired.

The cap 33 is provided with an opening 34. Disposed within the cap 33 and over the opening 34 is a permeable body 35. The body 35 is permeable in the sense that liquid nutrients may not flow readily, but are able to diffuse through the body 35 and out of the container 31. The permeable body 35 permits the controlled release of nutrients. That is, it allows the diffusion of sufficient nutrients to sustain the biological media, but the rate of permeation therethrough is not be so great that excessive, and especially harmful amounts of nutrients are released into the aquarium water.

The optimum rate of permeation through the permeable body will vary somewhat and is selected in accordance with the flow rate through the biological media and the amount of nutrient required by the biological media. The rate of permeation achieved by the dispenser in turn is determined in part by the porosity, or permeability coefficient (the rate of permeation for a given permeate through a given media at standard conditions) of the permeable body, which itself depends on the nature of the liquid nutrient, or more precisely, on the nature of its constituent molecules. A given material in general will be more permeable to nutrients having smaller and more streamlined molecules. For example, nutrients which have large molecular sizes will tend to permeate more slowly than nutrients having smaller molecules. Molecular interactions between the nutrient and the material from which the porous body is constructed, however, also can affect the porosity.

The rate of permeation achieved by the dispenser also is dependent on the size of the cap opening 34, the thickness of the permeable body, and the differential between the concentration of nutrient in the dispenser and the concentration of the nutrient in the aquarium water. As that concentration differential increases so will the rate of permeation. Because the concentration differential does not remain constant, the rate of permeation also does not remain constant and in general will decline as nutrient permeates into the aquarium water and is consumed.

The permeable body 35 is exemplified as being discshaped, but the shape thereof in general is a matter of convenience. It will be appreciated, however, that the permeable body 35 preferably is configured so that a portion of the permeable body 35, i.e., its edges, are disposed between the container 31 and the cap 33 when the cap 33 is engaged with the container 31. In that manner, the permeable body 35 also serves as a gasket, thereby increasing the reliability of the seal between the container 31 and the cap 33 and reducing the likelihood of leaks therethrough.

Suitable permeable bodies may be fabricated by conventional techniques, e.g., punching them out of sheets of permeable material which is commonly used for controlled fluid delivery at low rates. Such permeable material can be composed of a number of well-known materials such as metals, glass, ceramics, and plastics. Porous plastic material such as dense films, microporous membranes, and composites thereof, however, are especially preferred because of their generally high degree of chemical inertness, their availability is a wide range of pore structures and sizes, the ability to modify the surface properties thereof, and the ease with which they may be fabricated into suitable shapes. Plastics from which such dense films and mircroporous membranes may be made include polyethylene, polypropylene, polyvinylidene fluoride, polystyrene, ethylene vinyl acetate, polytetrafluoroethylene, polyamides, polyesters, acrylics, and cellulosics. Such porous plastic materials are available commercially, e.g., from Chromex Corportion, Brooklyn, N.Y. and Pall Corp., East Hills, N.Y.

As is true for the container, the permeable body should be substantially inert. Otherwise, the selection of a suitable permeable material will be guided primarily by the choice of nutrient and the porosity required to achieve a desired rate of permeation.

Figure 1:
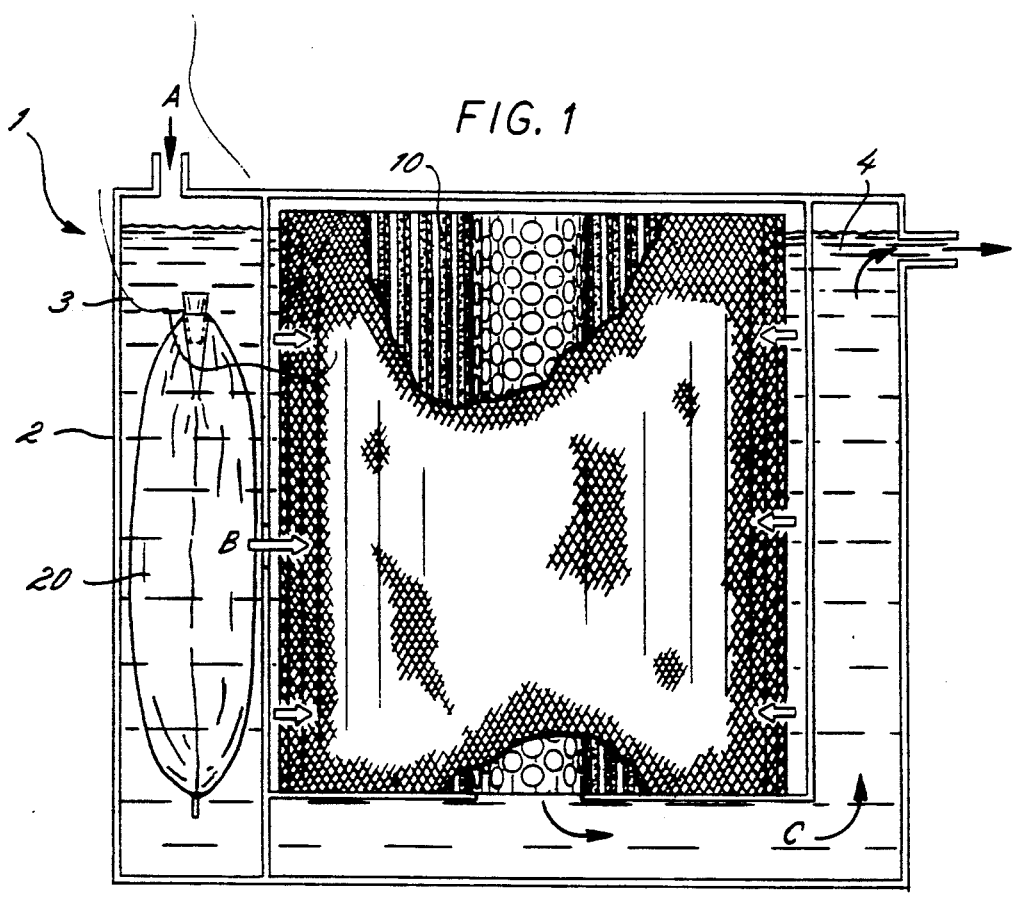
FIG. 1 is a generally cross-sectional view of a prior art denitrifying biological filter unit, which view shows a prior art liquid nutrient dispenser disposed within a chamber of the filter unit.

The dispensers of the subject invention may be used in a variety of well-known filter units, such as the denitrifying biological filter unit shown in FIG. 1, when it is necessary or desirable to provide liquid nutrients to a biological filter media. Liquid nutrient is introduced into the container 31. Such nutrients are liquid in the sense that they may be in a liquid state or dissolved in or carried by water or another compatible solvent.

It will be appreciated that the cap 33, the opening 34 in the cap 33, and the permeable body 35 covering the opening 34 provide both means for preventing the flow of liquid nutrients out of the container 31 and means for allowing the nutrient to permeate to the exterior of the container 31. Thereby, a supply of nutrients is dispensed in a controlled manner to the biological filter media 10.

Because the novel nutrient dispensers are separate and apart from the biological filter media, they may be removed from the filter unit 1, and replaced with a new or refilled dispenser without disturbing in any manner the bacteria culture or necessitating its reestablishment.

Moreover, the dispensers of the subject invention also may be more easily inserted into a nutrient chamber. Because the container is sufficiently rigid so that its shape is not significantly distorted when liquid nutrient is introduced therein, it is not necessary to squeeze, compress, or otherwise reconform the shape of the container to a nutrient chamber and thereby risk spillage of nutrient.

The rigidity of the container also allows the container to be more accurately filled with a predetermined quantity of liquid nutrient. Unlike the prior art bag dispenser 20, wherein the capacity of the bag 21 may depend on the manner in which it is held during the refilling process, the shape of the containers of the subject invention is not significantly distorted during the refilling process. The capacity thereof is substantially constant.

It also will be appreciated that in selecting a container which is rigid according to the teachings of the subject disclosure a more durable and a more leak-resistant dispenser having a longer useful life is provided for as well. Such containers are not prone to puncture and the seams in such containers are more durable.

The invention is further described by reference to the following examples. They are not intended to limit the scope of the invention; rather, they are presented merely to facilitate the practice of the invention by those of ordinary skill in the art and to further disclose the inventor's best mode of doing so.

EXAMPLES

A test dispenser was constructed in accordance with the subject invention for evaluation. It was constructed essentially as shown in FIGS. 3 and 4 from a high density polyethylene flask-shaped bottle having a plastic screw cap. The capacity of the bottle was about four fluid ounces, and it was provided with an opening approximately 11/16 inches in diameter. An opening approximately 11/16 inches in diameter was drilled through the cap and a permeable disk inserted into the cap and over the opening in the cap.

The permeable disk was approximately ⅞ inches in diameter and approximately 1/16 inch in thickness. It was composed of ISM ™ hydrophobic supported membrane material obtained from Chromex Corporation. The material was composed of a nitrocellulose membrane having a pore size of approximately 1.2 microns fused onto an ultra high molecular weight polyethylene support having a pore size of approximately 10 microns or greater.

The test dispenser was filled to capacity with an aqueous 33% methanol solution. It was observed that the filling process was easily and accurately accomplished and involved little risk of spillage. The dispenser itself further was observed to be leak-tight and rugged in construction.

EXAMPLE 1

Figure 2:
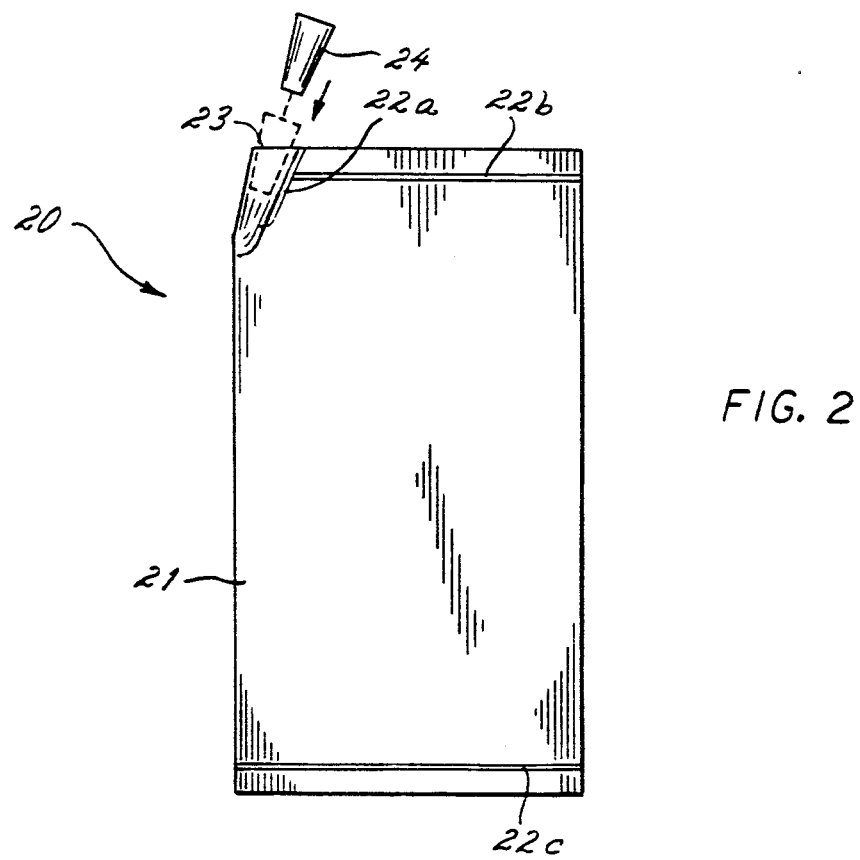
FIG. 2 is a cross-sectional view of the prior art liquid nutrient dispenser shown in FIG. 1, which view shows the construction thereof.

An aquarium, as described below, may be set up to permit the evaluation of a prior art liquid nutrient dispenser bag substantially as shown in FIGS. 1 and 2.

The aquarium is a 100-gallon, acrylic aquarium with an Minireef® H-30 filter unit manufactured and sold by International Seaboard. The H-30 filter unit comprises, inter alia, a single-spinner, wet/dry biological filter media and a denitrifying biological media, which denitrifying component is substantially as shown in FIG. 1.

The H-30 unit uses a Denitra ™ nutrient dispenser bag sold by International Seaboard which is composed of a flexible porous plastic sheet material having a is approximately 4 inches wide and 7¼ inches long unfilled. The Denitra ™ bag is filled approximately half full and inserted into the H-30 filter unit.

The aquarium is provided with actinic lightbulbs, e.g., two 40 watt Daylight bulbs sold by Slyvania and one 40 watt actinic bulb sold by Phillips.

The flow through the filter unit is approximately 400 gallons/hour, and the flow rate of the water diverted through the denitrifying component is approximately 20 gallons/day.

Upon establishment of the biological media in the aquarium, the aquarium contains the following stock: one large purple sabae anemone; one large sabae anemone; one medium sabae anemone; one large colt polyps; one medium colt polyps; one medium leather coral; one small leather coral; one medium giant mushroom anemone; one medium bubble coral; one small double coral; two medium button polyps; one medium majestic angel; one large manderin goby; two medium percula clowns; one medium pinkskunk clown; one medium black blenhy; one medium skunk shrimp; six grape plants; and 150 lbs. of live base rocks.

It will be observed that the water quality in the established aquarium will be maintained, and specifically, that the nitrate levels will remain sufficiently low to sustain the described stock. The Denitra ™ bag will dispense sufficient nutrient to sustain the denitrifying bacteria while at the same time preventing harmful quantities of nutrient from leaking into the water. Further, the nutrient in the Denitra ™ bag will be substantially exhausted in approximately one month.

EXAMPLE 2

An established aquarium may be provided to evaluate the performance of a dispenser of the subject invention. The established aquarium is identical to that described in Example 1, except that the test dispenser constructed from the polyethylene bottle as described above is substituted for the Denitra ™ bag.

It will be observed that the substitution of the test dispenser constructed in accordance with the subject invention does not in any way disturb the established denitrifying media. It further will be observed that the water quality, including the nitrate levels, remains substantially unchanged from that observed with the Denitra ™ bag. The nutrient in the novel test dispenser will be substantially exhausted in approximately one month.

From the foregoing examples it will be appreciated that the novel dispensers disclosed herein are rugged and leak-resistant and may be easily and accurately filled. They also may be easily inserted into the filter unit to replenish the nutrient without disturbing the denitrifying biological media. It also will be appreciated that the novel dispensers will dispense nutrient in an amount which is sufficient to sustain the denitrifying media but which will not harm the aquarium stock.

While this invention has been disclosed and discussed primarily in terms of specific embodiments thereof, particularly in the context of denitrifying biological media, it is not intended to be limited thereto. It may be used to dispense nutrients if needed by other types of biological media. As a further example, the permeable body is illustrated as being disposed over a hole in the cap. Alternately, however, the permeable body may be disposed over an opening provided in the container itself. Other modifications and embodiments will be apparent to the worker in the art.

I claim:

1. A filter for an aquarium, which filter comprises at least one biological fitler media and a dispenser for liquid nutrients used to sustain the metabolism of said biological filter media, wherein said dispenser comprises:
    (a) a rigid container having an opening therein adapted to permit the introduction of liquid nutrients into said container;
    (b) means for preventing the flow out of said container through said opening of liquid nutrient introduced therein; and
    (c) means for allowing the permeation to the exterior of said container of liquid nutrient introduced therein.

2. The dispenser of claim 1, wherein said flow prevention means and said permeation means comprise:
    a cap adapted to removably engage said container such that said cap covers said opening therein;
    an opening in said cap; and
    a permeable body covering said opening in said cap.

3. The dispenser of claim 2, wherein a portion of said permeable body, when said cap is engaged with said container, is disposed between said container and said cap.

4. The dispenser of clami 1, wherein said container is composed of rigid plastic.

5. The dispenser of claim 2, wherein said container is composed of rigid plastic.

6. The dispenser of claim 3, wherein said container is composed of rigid plastic.

7. The dispenser of claim 1, wherein said flow prevention means and said permeation means are composed at least in part of porous plastic.

8. The dispenser of claim 4, wherein said flow preventi-on-means and said permeation means are composed at least in part of porous plastic.

9. The dispenser of claim 5, wherein said permeable body is composed of porous plastic.

10. The dispenser of claim 6, wherein said permeable body is composed of porous plastic.

* * * * *